United States Patent
Shirai et al.

(10) Patent No.: US 6,515,833 B1
(45) Date of Patent: Feb. 4, 2003

(54) ROTATING DRUM ASSEMBLY AND MAGNETIC RECORDING/REPRODUCING APPARATUS HAVING A TAPE-CONTACT PIECE

(75) Inventors: Toshio Shirai, Kanagawa (JP); Tadashi Ozue, Kanagawa (JP); Yoshiteru Kamatani, Kanagawa (JP); Ichiro Hashimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/374,594

(22) Filed: Aug. 16, 1999

(30) Foreign Application Priority Data

Aug. 20, 1998 (JP) ............................................. 10-234658
Jun. 25, 1999 (JP) ............................................. 11-180170

(51) Int. Cl.⁷ ........................... G11B 5/52; G11B 15/61; G11B 21/18
(52) U.S. Cl. ................. 360/271.1; 360/84; 360/130.23
(58) Field of Search ....................... 360/271.1, 130.22, 360/130.23, 130.24, 84

(56) References Cited

U.S. PATENT DOCUMENTS

| | | | |
|---|---|---|---|
| 4,849,839 A | * 7/1989 | Tsubota et al. | ................ 360/84 |
| 5,130,875 A | * 7/1992 | Ono et al. | |
| 5,630,104 A | * 5/1997 | Ottensen et al. | |
| 5,654,842 A | * 8/1997 | Takeda et al. | |
| 5,737,154 A | * 4/1998 | Kumagai et al. | |

FOREIGN PATENT DOCUMENTS

| JP | 55-038675 | * 3/1980 |
|---|---|---|
| JP | 60-182042 | * 9/1985 |
| JP | 03-016010 | * 1/1991 |
| JP | 03-178024 | * 8/1991 |
| JP | 05-081626 | * 4/1993 |
| JP | 07-073422 | * 3/1995 |
| JP | 08-055391 | * 2/1996 |
| JP | 09-128722 | * 5/1997 |
| JP | 09-305944 | * 11/1997 |

* cited by examiner

*Primary Examiner*—Craig A. Renner
(74) *Attorney, Agent, or Firm*—Sonnenschein, Nath & Rosenthal

(57) ABSTRACT

A rotating drum assembly, and a magnetic recording/reproducing apparatus including the rotating drum assembly, are provided. The rotating drum assembly comprises a cylindrical rotating drum; a magneto-resistive head installed on the rotating drum to project at least a part thereof from the outer surface of the rotating drum; and a tape-contact piece installed on the rotating drum so as to project from the outer surface of the rotating drum and to be in contact with the surface of a magnetic tape; the tape-contact piece being formed to have a larger tape-contact width than that of the magneto-resistive head and disposed to be in earlier contact with the magnetic tape than the magneto-resistive head.

14 Claims, 13 Drawing Sheets

DIRECTION
OF HEAD
TRAVEL

ROTATING DRUM ASSEMBLY AND MAGNETIC RECORDING/REPRODUCING APPARATUS HAVING A TAPE-CONTACT PIECE

The present application claims priority to Japanese Application No. P10-234658 filed Aug. 20, 1998, which application is incorporated herein by reference to the extent permitted by law. The present application also claims priority to Japanese Application No. P11-180170 filed Jun. 25, 1999.

BACKGROUND OF THE INVENTION

1. Field of the Invention

The present invention relates to a rotating drum assembly in which a magneto-resistive head is used as a read head, and a helical-scan magnetic recording/reproducing apparatus adopting the rotating drum assembly.

2. Description of Related Art

In magnetic recording/reproducing apparatuses such as a video tape recorder, audio tape recorder, computer data-storage system and the like using a magnetic tape as a recording medium, a helical-scanning system is adopted to provide an increased storage capacity by improving the recording density.

Such magnetic recording/reproducing apparatuses are required to have a higher recording density and storage capacity. To attain such high recording density and storage capacity, it has been proposed to use a magneto-resistive head (will be referred to as "MR head" hereinafter) as a read head in the helical-scan magnetic recording/reproducing apparatus.

The MR head uses a magneto-resistive element (will be referred to as "MR element" hereinafter) to detect a magnetic field from a recording medium, and it is practically used as a read head of a hard disc drive. Generally, the MR head is more sensitive than the inductive head and provides a larger read output. Therefore, use of the MR head as a read head permits to attain a further higher recording density and storage capacity in practice.

The hard disc drive is adapted to read data with the MR head installed on a levitation slider and thus kept levitated on a magnetic disc. On the contrary, in a helical-scan magnetic recording/reproducing apparatus adopting the MR head as a read head, data is read from a magnetic tape with the MR head being slid on the magnetic tape.

However, the sliding of the MR head in contact on the magnetic tape can assure a large read output but leads to an abrasion of the MR head itself. When the MR head is abraded, the read output level varies and much noise takes place, which will cause read information signal to be deteriorated.

Especially an unused magnetic tape has a rougher surface that a used one. Therefore, when an unused magnetic tape is initially used, the MR head will be abraded very much due to the friction with the magnetic tape. Therefore, when designing the life of an MR head, much consideration should be given to how frequently the MR head is to be used with an unused magnetic tape. Eventually, the MR head cannot be designed to have a longer life.

Hence, a helical-scan magnetic recording/reproducing apparatus has not yet been developed which uses an MR head as a read head.

SUMMARY OF THE INVENTION

Accordingly, the present invention has an object to overcome the above-mentioned drawbacks of the prior art by providing a rotating drum assembly provided with an MR head as a read head, and a helical-scan magnetic recording/reproducing apparatus adopting the rotating drum assembly.

The above object can be attained by providing a rotating drum assembly comprising according to the present invention:

a cylindrical rotating drum;

a magneto-resistive head installed on the rotating drum to project at least a part thereof from the outer surface of the rotating drum; and a tape-contact piece installed on the rotating drum so as to project from the outer surface of the rotating drum and to be in contact with the surface of a magnetic tape;

the tape-contact piece being formed to have a larger tape-contact width than that of the magneto-resistive head and disposed to be in earlier contact with the magnetic tape than the magneto-resistive head.

As mentioned above, the rotating drum assembly has the tape-contact piece formed to have the larger tape-contact width than the magneto-resistive head and disposed to be in earlier contact with a magnetic tape than the magneto-resistive head. The tape-contact piece smoothes the surface of the magnetic tape to prevent the magneto-resistive head from easily being abraded. The tape-contact piece may be a dummy head, inductive head or projection installed on the rotating drum to project from the outer surface of the rotating drum.

Also, in the rotating drum assembly according to the present invention, in case a dummy head is used as the tape-contact piece, the projection of the dummy head from the outer surface of the rotating drum should be larger than that of the magneto-resistive head from the outer surface of the rotating drum, whereby the pressure of contact between the magneto-resistive head and a magnetic tape can be smaller than that between the dummy head and magnetic tape to prevent the magneto-resistive head from easily being abraded.

Also, the above object can be attained by providing a helical-scan magnetic recording/reproducing apparatus comprising according to the present invention:

a cylindrical rotating drum;

a magneto-resistive head installed on the rotating drum to project at least a part thereof from the outer surface of the rotating drum; and a tape-contact piece installed on the rotating drum so as to project from the outer surface of the rotating drum and to be in contact with the surface of a magnetic tape;

the tape-contact piece being formed to have a larger tape-contact width than that of the magneto-resistive head and disposed to be in earlier contact with the magnetic tape than the magneto-resistive head.

In the magnetic recording/reproducing apparatus according to the present invention, the rotating drum has installed thereon the tape-contact piece formed to have the larger tape-contact width than the magneto-resistive head and disposed to be in earlier contact with a magnetic tape than the magneto-resistive head. The tape-contact piece smoothes the surface of the magnetic tape to prevent the magneto-resistive head from easily being abraded. The tape-contact piece may be a dummy head, inductive head or projection installed on the rotating drum to project from the outer surface of the rotating drum.

Also, in the magnetic recording/reproducing apparatus according to the present invention, in case a dummy head is used as the tape-contact piece, the projection of the dummy head from the outer surface of the rotating drum should be larger than that of the magneto-resistive head from the outer surface of the rotating drum, whereby the pressure of contact between the magneto-resistive head and a magnetic tape can be smaller than that between the dummy head and magnetic tape to prevent the magneto-resistive head from easily being abraded.

These objects and other objects, features and advantages of the present intention will become more apparent from the following detailed description of the preferred embodiments of the present invention when taken in conjunction with the accompanying drawings.

DETAILED DESCRIPTION OF THE PREFERRED EMBODIMENTS

The magnetic recording/reproducing apparatus according to the present invention uses a magnetic tape as a recording medium. It is used as a video tape recorder, audio tape recording, computer data-storage system or the like, for example. The magnetic recording/reproducing apparatus according to the present invention is a helical-scan type one using a rotating drum. The rotating drum has installed thereon an MR head as a read head.

First Embodiment

Figure 1:
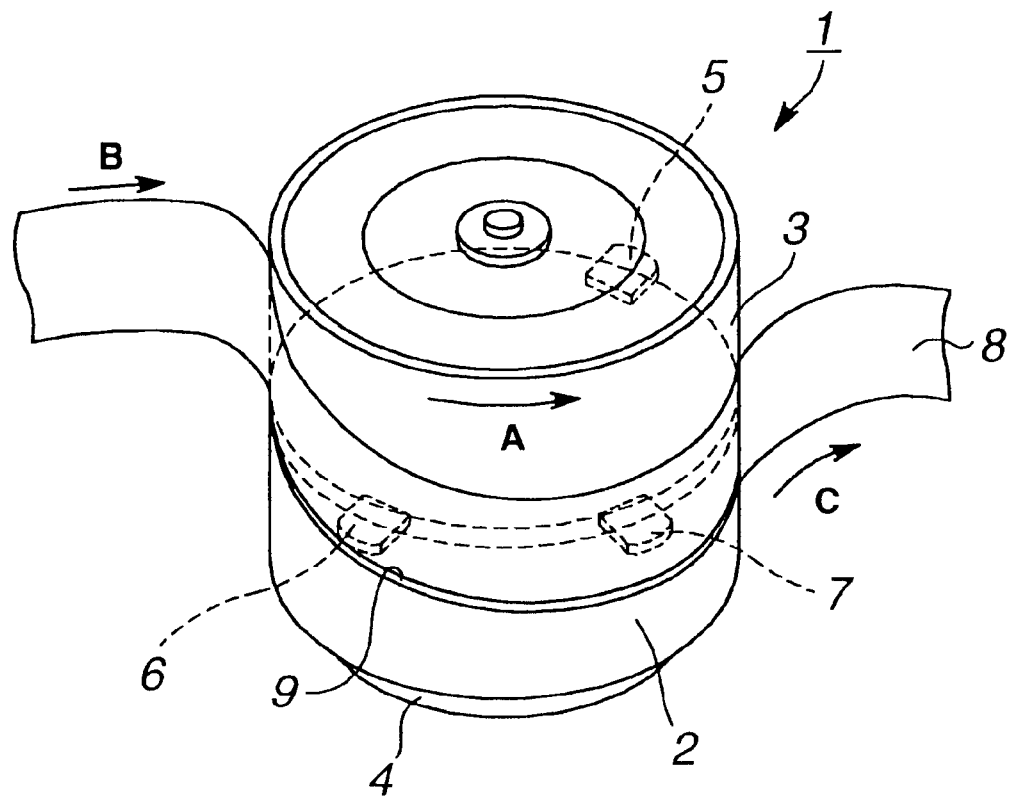
FIG. 1 is a perspective view of an embodiment of rotating drum assembly according to the present invention, showing an example of the construction thereof.

Referring now to FIG. 1, there is schematically illustrated in perspective a first embodiment of rotating drum assembly according to the present invention. The rotating drum assembly according to the present invention is to be installed in a magnetic recording/reproducing apparatus. In FIG. 1, the rotating drum assembly is generally indicated with a reference 1.

As shown in FIG. 1, the rotating drum assembly 1 comprises a cylindrical fixed drum 2, cylindrical rotating drum 3, drive motor 4 for the rotating drum 3, inductive head 5 mounted on the rotating drum 3, MR head 6 installed on the rotating drum 3, and a dummy head 7 installed on the rotating drum 3.

As in the above, the rotating drum assembly 1 has the rotating drum 3 mounted on the fixed drum 2. That is, in this rotating drum assembly 1, the upper one of the drums, namely, the rotating drum 3 on the fixed drum 2 is driven to rotate. However, it should be noted that since the present invention can be applied to many types of helical-scan magnetic recording/reproducing apparatuses, the rotating drum assembly 1 may be of any type. For example, the rotating drum assembly 1 may be a one in which a rotating drum 3 is disposed between a pair of fixed drums 2, namely, the middle one of the drums is driven to rotate.

In the rotating drum assembly 1, the fixed drum 2 is held stationary without being rotated. As seen from FIG. 1, the fixed drum 2 has a lead guide 9 formed on the side face thereof along the traveling direction of a magnetic tape 8. As will further be described later, the magnetic tape 8 travels along the lead guide 9 during write or read thereto or therefrom. The rotating drum 3 is disposed concentrically with the fixed drum 2.

In the rotating drum assembly 1, the rotating drum 3 is driven to rotate at a predetermined speed by the motor 4 during write to or read from the magnetic tape 8. The rotating drum 3 is a cylinder formed to have the same diameter as the fixed drum 2 and disposed concentrically with the fixed drum 2 as described just above. The rotating drum 3 has the inductive head 5 and MR head 6 installed on an axial end thereof opposite to the fixed drum 2.

The inductive head 5 comprises a pair of magnetic cores joined to each other with a gap between them and with a coil wound on the cores. The inductive head 5 is used to write information to the magnetic tape 8. The inductive head 5 may be any one of the conventional inductive heads adopted in the conventional helical-scan magnetic recording/reproducing apparatuses.

Figure 2:
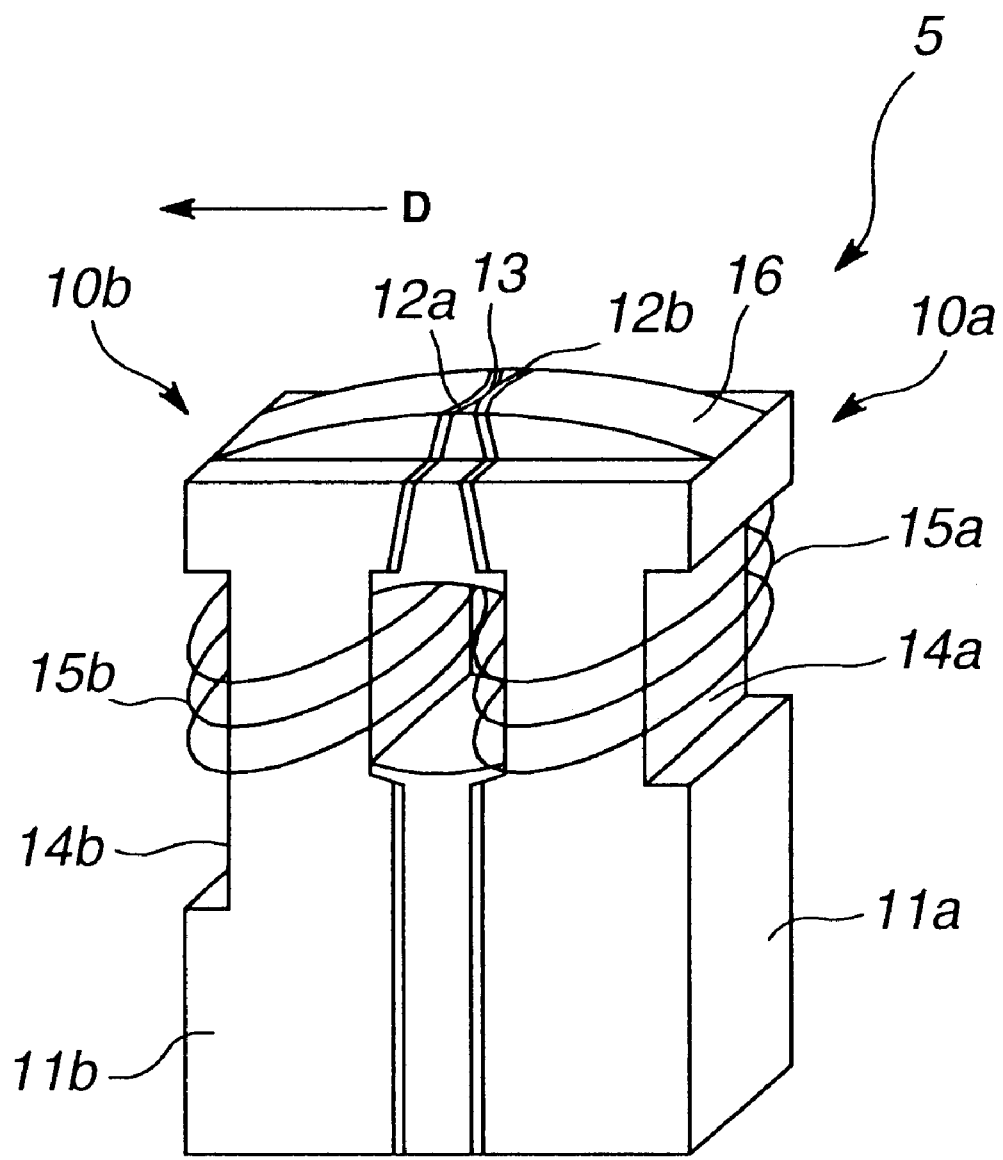
FIG. 2 is a perspective view of an example of inductive head installed on the rotating drum in FIG. 1.

FIG. 2 is a perspective view of the inductive head 5 installed on the rotating drum 2. As shown, the inductive head 5 comprises the magnetic cores 10a and 10b consisting of soft magnetic substrates 11a and 11b, respectively, made of ferrite, and magnetic metal layers 12a and 12b formed on the soft magnetic substrates 11a and 11b, respectively. The magnetic cores 10a and 10b in pair are joined to each other with a gap 13 between them so that the magnetic metal layers 12a and 12b oppose each other. The magnetic cores 10a and 10b have formed thereon, respectively, recesses 14a and 14b in which coils 15a and 15b are wound, respectively. That is to say, a so-called MIG (metal in gap) type magnetic head is very suitable for use as the inductive head 5.

The inductive head 5 is installed on the rotating drum 3 for at least a part thereof to project from the outer surface of the rotating drum 3. Furthermore, the inductive head 5 has a sliding surface 16 cylindrically ground in a sliding direction of arrow D of the inductive head 5 in relation to the magnetic tape 8 and also in a direction perpendicular to the sliding direction.

The tape-sliding surface 16 of the inductive head 5 is generally spherically formed to project most at the gap 13 and its vicinity. The inductive head 5 is installed on the rotating drum 3 to project at the gap 13 and its vicinity from the outer surface of the rotating drum 3.

On the other hand, the MR head 6 has an MR element to detect a signal of magnetic field from the magnetic tape 8 by the magneto-resistance effect. Generally, the MR head 6 is higher in sensitivity and read output than the inductive head 5 to write and read information signal to and from a magnetic tape by the electromagnetic induction. Thus, the MR head 6 is suitable for a high-density recording. Therefore, use of the MR head 6 as a read head permits to attain a higher density of recording.

Figure 3:
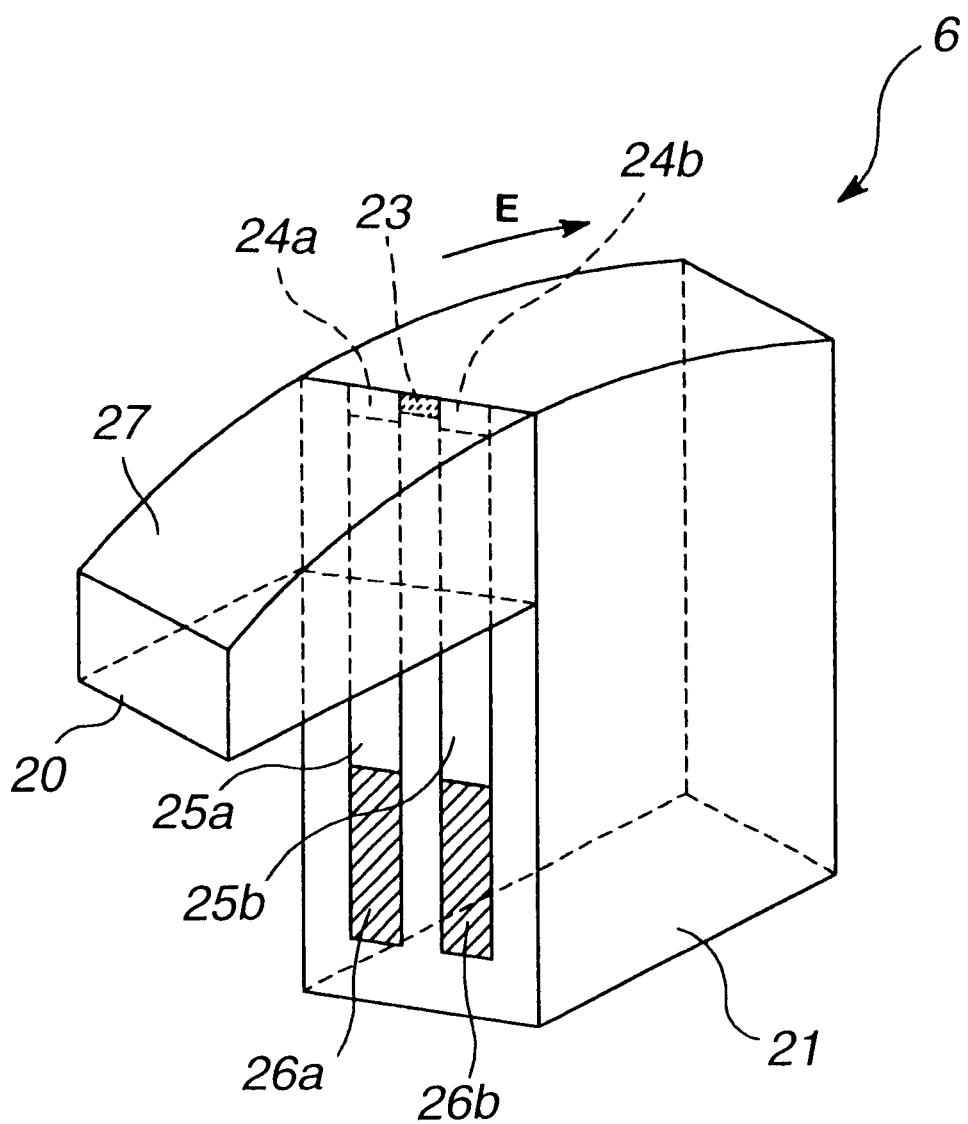
FIG. 3 is a perspective view of an example of MR head installed on the rotating drum in FIG. 1.
Figure 4:
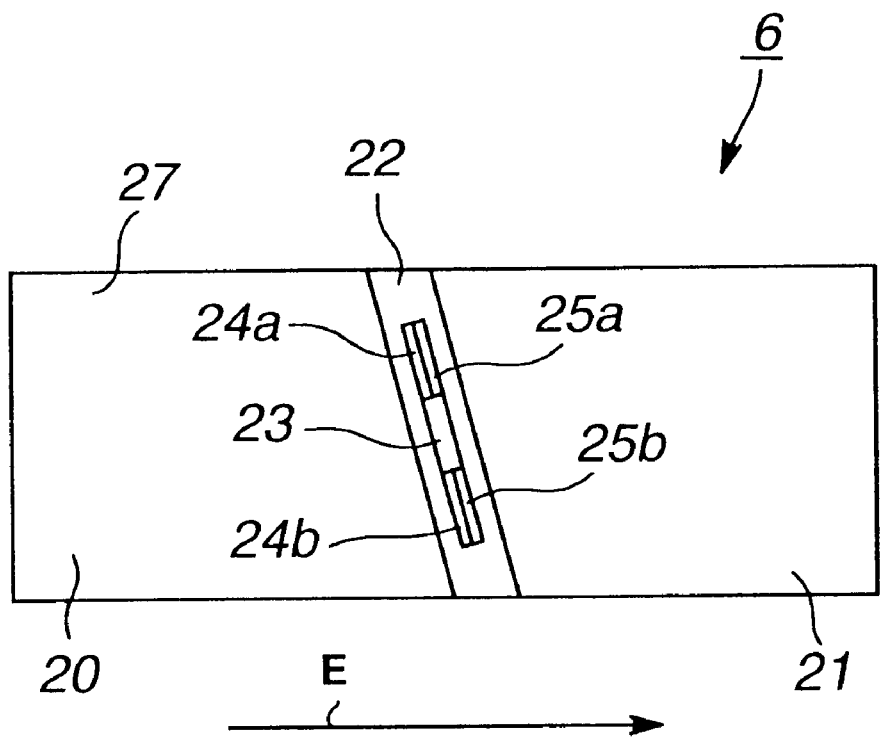
FIG. 4 is a plan view of the MR head in contact with a magnetic tape as viewed from the tape side.

FIG. 3 is a perspective view of the MR head 6 installed on the rotating drum 3, and FIG. 4 is a plan view of the MR head 6 in contact with the magnetic tape 8. As shown, the MR head 6 comprises a pair of magnetic shields 20 and 21 made of soft magnetic material, an MR element piece 23 buried and held in an insulator 22 between the pair of magnetic shields 20 and 21, permanent magnet layers 24a and 24b disposed on opposite ends of the MR element piece 23, and conductors 25a and 25b disposed also on opposite ends of the MR element piece 23.

The MR element piece 23 consists of an MR element having the magneto-resistance effect, a SAL (soft adjacent layer) to apply a vertical bias field to the MR element, and an insulator layer disposed between the MR element and SAL.

The permanent magnets 24a and 24b apply a horizontal field to the MR element. The conductors 25a and 25b supply the MR element with a sense current via external terminals 26a and 26b formed at the ends of the conductors 25a and 25b, respectively.

In the MR head 6, the MR element piece 23 is formed flat to have a generally rectangular shape whose shorter axis direction is generally perpendicular to a tape-sliding surface 27 of the MR head 6. The MR element piece 23 is buried and held in the insulator 22 between the pair of magnetic shields 20 and 21 for one lateral face thereof to be exposed at the tape-sliding surface 27.

The MR head 6 is installed on the rotating drum 3 for at least a part thereof to project from the outer surface of the rotating drum 3. Furthermore, the MR head 6 has the sliding surface 27 cylindrically ground in a sliding direction of arrow E (as in FIGS. 3 and 4) of the MR head 6 in relation to the magnetic tape 8 and also in a direction perpendicular to the sliding direction.

The tape-sliding surface 27 of the MR head 6 is generally spherically formed to project most at the MR element 23 and its vicinity. The MR head 6 is installed on the rotating drum 3 to project at the MR element 23 and its vicinity from the outer surface of the rotating drum 3.

The dummy head 7 writes and reads no information signal to and from the magnetic tape 8. The dummy head 7 is installed on the rotating drum 3 in a position ahead of the MR head 6 for at least a part thereof to project from the outer surface of the rotating drum 3. Thus, when the MR head 6 slides on the magnetic tape 8 to read information signal, the dummy head 7 will first slide in contact on a portion of the magnetic tape 8 and then the MR head 6 will slide in contact on the same portion, whereby the surface of the magnetic tape 8 is smoothed to prevent the MR head 6 from easily being abraded.

Figure 5:
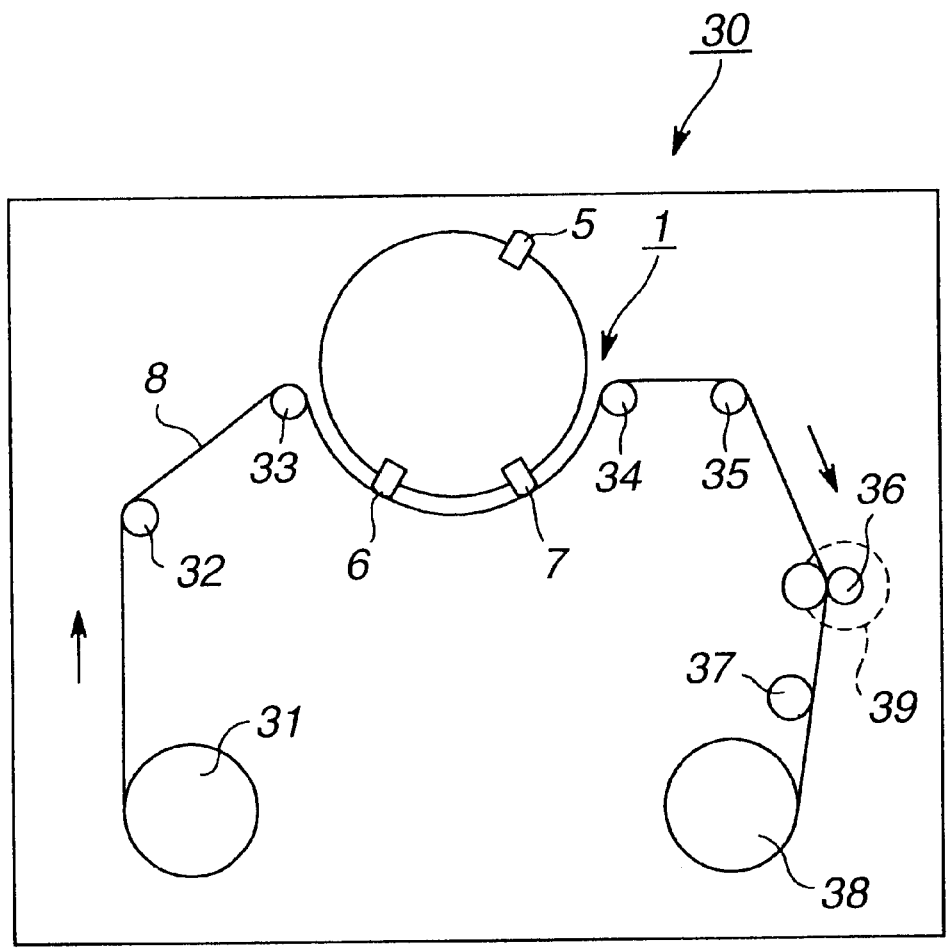
FIG. 5 is a plan view of the magnetic recording/reproducing apparatus according to the present invention, showing an example of the construction of the magnetic tape feeding mechanism.

FIG. 5 is a plan view of the magnetic recording/reproducing apparatus according to the present invention, showing the construction thereof. As shown, in the magnetic recording/reproducing apparatus, the magnetic tape 8 is slid on the rotating drum assembly 1 to write or read data to or from the magnetic tape 8. The magnetic recording/reproducing apparatus has a magnetic tape feeding mechanism 30 including the rotating drum assembly 1 as shown in FIG. 5.

More specifically, during write to or read from the magnetic tape 8, the latter is fed from a supply reel 31 over guide rollers 32 and 33 to the rotating drum assembly 1 on which it will be wound, as shown in FIG. 5. At the rotating drum assembly 1, write or read is done to or from the magnetic tape 8.

For writing data to the magnetic tape 8, the inductive head 5 is slid on the magnetic tape 8 to write data to the magnetic tape 8. For reading data from the magnetic tape 8, the MR head 6 is slid on the magnetic tape 8 to read data having been written to the magnetic tape 8 by the inductive head 5.

When the inductive head 5 is slid on the magnetic tape 8 or when the MR head 6 is slid on the magnetic tape 8, the magnetic tape 8 is supported mainly by the rotating drum 3 and air flow caused to arise mainly by the rotating drum 3 being rotated. At this time, the inductive head 5 projected at the gap 13 and their vicinity from the outer surface of the rotating drum 3 and the MR head 6 projected at the MR element piece and their vicinity from the outer surface of the rotating drum 3, slide in contact on the magnetic tape 8 while seemingly pitching a tent of the magnetic tape 8. Further, the inductive head 5 has the tape-sliding surface 16 cylindrically ground for the gap 13 and its vicinity to project most and also it is installed on the rotating drum 3 for these portions to project from the outer surface of the rotating drum 3. Thus, the gap 13 will have a good contact with the magnetic tape 8. Also, the MR head 6 has the tape-sliding surface 27 cylindrically ground for the MR element piece 23 and its vicinity to project most and also it is installed on the rotating drum 3 for these portions to project from the outer surface of the rotating drum 3. Thus, the MR element piece 23 will also have a good contact with the magnetic tape 8.

If the magnetic head slides on the magnetic tape 8 at a high speed, the tape-sliding surface of the magnetic head will be abraded due to the sliding in contact on the magnetic tape 8. Especially, the MR head 6 will heavily be abraded since its depth is small.

On the other hand, the magnetic tape 8 has many fine irregularities thereon. Such fine irregularities will assure a good contact with the magnetic tape, but will seriously abrade the magnetic head. Also the fine irregularities will be removed little by little as the magnetic head is repeatedly slid in contact on the magnetic tape 8, and thus the magnetic tape 8 will have the surface thereof smoothed gradually due to the friction with the magnetic head.

An unused magnetic tape 8 initially has fine irregularities on the surface thereof, and hence the surface is very rough. Therefore, when such an unused magnetic tape 8 is used on the magnetic head, the latter will be abraded very much due to the sliding in contact on the magnetic tape 8. Therefore, when designing the life of an MR head 6, much consideration should be given to how frequently the MR head 6 is to be used with an unused magnetic tape. Eventually, the MR head 6 cannot be designed to have a longer life.

For a longer life of the MR head 6, the rotating drum assembly 1 is provided with the dummy head 7 in a position ahead of the MR head 6 in relation to the magnetic tape 8 as shown in FIGS. 1 and 5.

The dummy head 7 writes and reads no information signal to and from the magnetic tape 8, but travels ahead of the MR head 6. Thus, it will first slide in contact on the magnetic tape 8 before the MR head 6 slides in contact on the magnetic tape 8, thereby smooth the surface of the magnetic tape 8. Therefore, even if the magnetic tape 8 is an unused one initially used on the rotating drum assembly 1, the MR head 6 can be prevented from easily being abraded.

Next, the geometric relation between the MR head 6 and dummy head 7 will be described herebelow:

The magnetic tape 8 used in a helical-scan magnetic recording/reproducing apparatus has data tracks formed thereon at a predetermined angle with respect to the length thereof The MR head 6 will trace the data tracks to read information signal from the magnetic tape 8.

Figure 6:
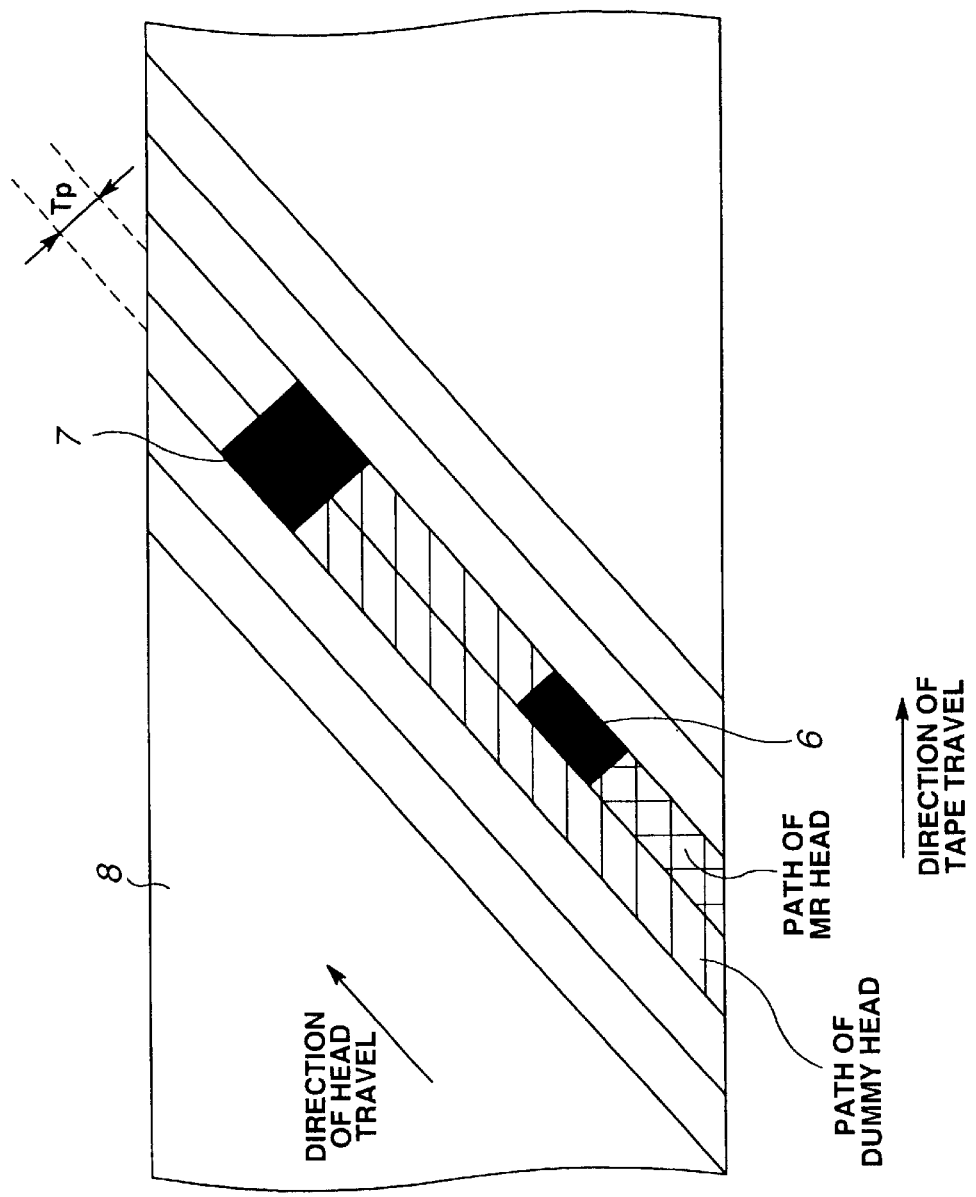
FIG. 6 is a plan view of a magnetic tape, showing a format of data tracks formed on the magnetic tape.

As shown in FIG. 6 for example, the magnetic tape 8 has data tracks formed thereon at a pitch Tp. Assume here that the magnetic tape 8 is fed or travels over a distance (track pitch) Tp each time the rotating drum is rotated one full turn. At this time, the magnetic tape 8 slides obliquely with respect to the fixed and rotating drums 2 and 3 along the lead guide 9 on the fixed drum 2 as shown in FIG. 1.

Figure 7:
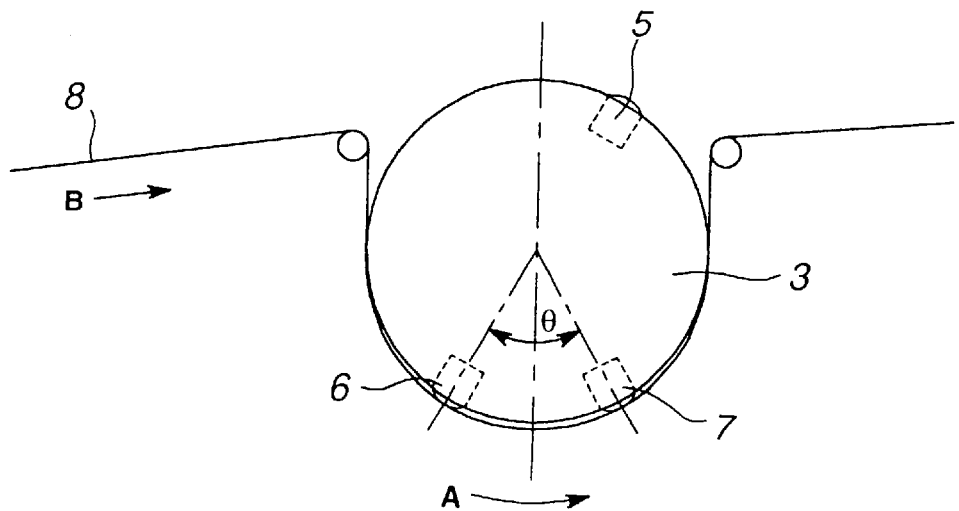
FIG. 7 is a plan view of the rotating drum assembly in FIG. 1.
Figure 8:
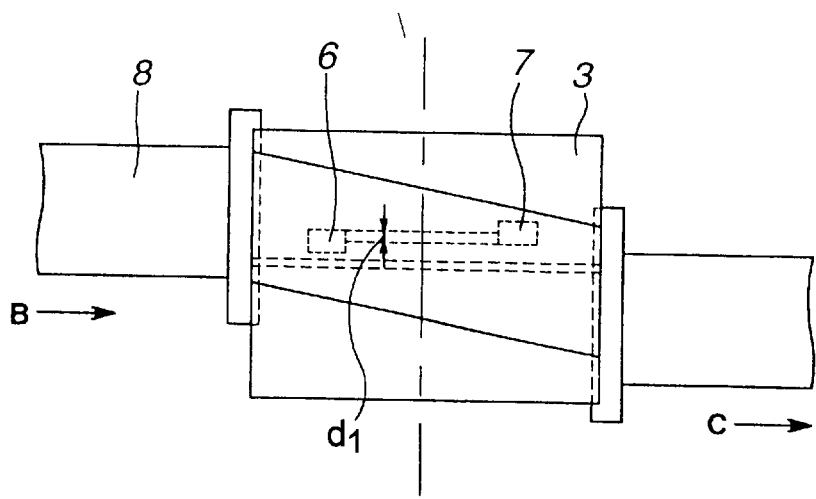
FIG. 8 is a side elevation of the rotating drum assembly in FIG. 1.

It is also assumed that in the rotating drum assembly 1, the dummy head 7 is installed on the rotating drum 3 in a position an angle θ ahead of the MR head 6 and $d_1$ higher than the MR head 6 (where $d_1$ is Tp×(θ/360) or more) as shown in FIGS. 7 and 8. FIG. 7 is a plan view of the rotating drum assembly 1, and FIG. 8 is a side elevation of the rotating drum assembly 1 in FIG. 1.

Owing to the geometric relation between the MR head 6 and dummy head 7 as described above, before the MR head 6 slides in contact on a portion of the magnetic tape 8, the dummy head 7 will first slide in contact on the same portion to smooth the surface of the magnetic tape portion 8 as shown in FIG. 6.

On the assumption that $d_1$ is TP×(n+θ/360) (where n is an integer larger than 2), the dummy head 7 will slide in contact on a portion of the magnetic tape 8 more then twice before the MR head 6 slides in contact on the same portion. Thus, the surface of the magnetic tape 8 is smoothed to prevent the MR head 6 from easily being abraded.

Further, the dummy head 7 is formed to have a larger width of contact with the magnetic tape 8 than the MR head 6. This larger tape-contact width of the dummy head 7 than that of the MR head 6 will assure that the MR head 6 can generally fully trace the magnetic tape portion on which the dummy head 7 has already slid. Therefore, even with an unused magnetic tape 8, the MR head 6 can be prevented from easily being abraded.

Also, in this rotating drum assembly 1, since the dummy head 7 always travels ahead of the MR head 6, foreign matters or material such as dust on the surface of the magnetic tape 8 can be removed by the dummy head 8. Thus, the MR head 6 can be prevented from being clogged with such foreign matters.

Although the aforementioned dummy head 7 is not limited to any special design, it should preferably be made of the same material as that of the MR head 6. Thus, the surface status of the magnetic tape 8 after sliding in contact on the dummy head 7 will be similar to that of the magnetic tape 8 after sliding in contact on the MR head 6. Thus, the magnetic tape 8 will have a good conformability with the MR head 6.

The magnetic tape 8 after write or read by the rotating drum assembly 1 is further passed to a take-up reel 38 over guide rollers 34 and 35, capstan 36 and a guide roller 37. Namely, the magnetic tape 8 is moved at the predetermined speed by the capstan 36 driven by a capstan motor 39, slid, under a predetermined contact pressure, on the inductive head 5 and MR head 6 installed on the rotating drum 3 and then wound on the take-up reel 38.

When the magnetic tape 8 is fed, the rotating drum 3 is driven to rotate by the motor 4 in the direction of arrow A in FIG. 1. On the other hand, the magnetic tape 8 is slid obliquely in relation to the fixed and rotating drums 2 and 3 along the lead guide 9 on the fixed drum 2. That is, the magnetic tape 8 is driven to travel from a tape inlet along the lead guide 9 in the direction of arrow B in FIG. 1 while sliding in contact on the fixed and rotating drums 2 and 3 and then towards a tape outlet in the direction of arrow C in FIG. 1.

As having been described in the above, if the magnetic head slides on the magnetic tape 8 at a high speed, the tape-sliding surface of the magnetic head will be abraded due to the sliding in contact on the magnetic tape 8. Especially, the MR head 6 will heavily be abraded, which will have a great influence on the write and read of information signal to and from the magnetic tape 8.

Figure 9:
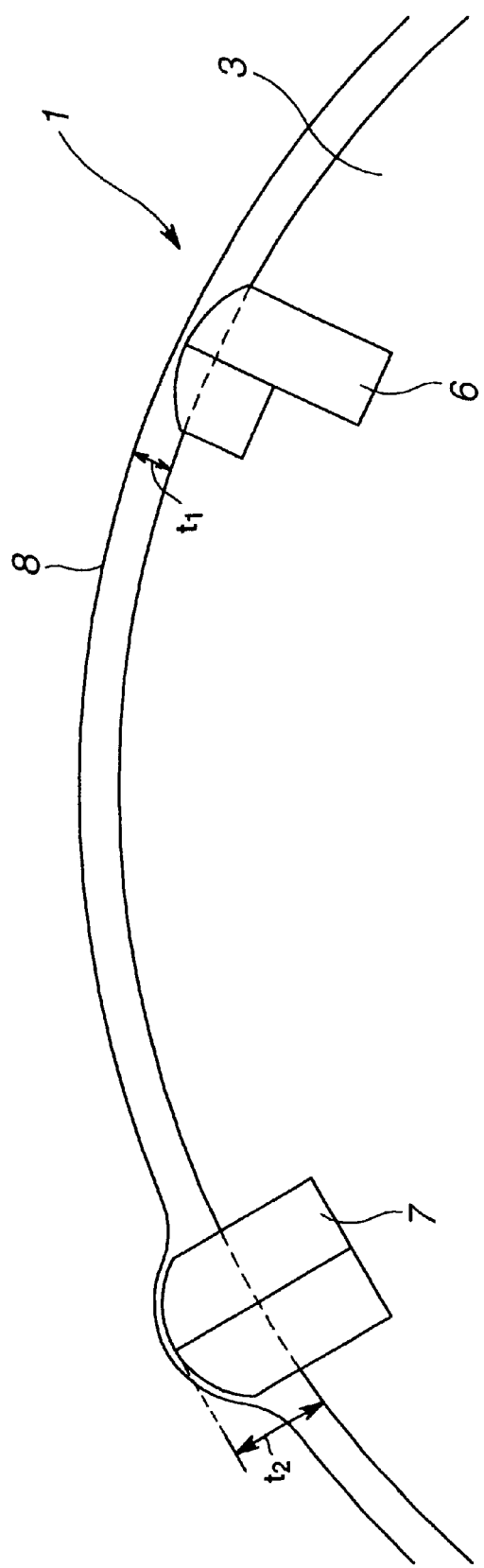
FIG. 9 shows the contact with the magnetic tape surface of the dummy and MR heads installed on the rotating drum to project from the outer surface of the rotating drum.

FIG. 9 schematically shows the projections of parts of the dummy and MR heads 7 and 6 from the outer surface of the rotating drum. As seen, in the rotating drum assembly 1, the projection $t_1$ of the MR head 6 from the outer surface of the rotating drum 3 is smaller than the projection $t_2$ of the dummy head 7 from the outer surface of the rotating drum 3. More specifically, the projection $t_2$ of the dummy head 7 is approximately two times of that $t_1$ of the MR head 6.

As in the above, the projection $t_1$ of the MR heads 6 is smaller than that $t_2$ of the dummy head 7 in this rotating drum assembly 1. Thus, when the dummy and MR heads 7 and 6 slide in contact on the magnetic tape 8 during write to or read from the latter, the pressure of contact of the MR head 6 with the magnetic tape 8 can be set smaller than that of the dummy head 7 with the magnetic tape 8. Therefore, in the rotating drum assembly 1, during read of information signal from the magnetic tape 8 by the MR head 6 sliding in contact on the latter, the MR head 6 can be prevented from easily being abraded due to the sliding in contact on the magnetic tape 8.

According to the present invention, the rotating drum assembly 1 is adapted such that the MR head 6 traces a path on the magnetic tape 8 on which the dummy head 7 has already traveled ahead of the MR head 6. Therefore, so long as the dummy head 7 is disposed in a position sufficiently higher than the MR head 6, the dummy and MR heads 7 and 6 as shown in FIG. 8 may not meet the required geometric relation of $t_1$=Tp×(θ/360). Namely, if the position of the dummy head 7 is sufficiently higher than that of the MR head 6, the MR head 6 can generally precisely trace a path on which the dummy head 7 has already traveled in contact, even when the path of the dummy head 7 is not coincident with that of the MR head 6.

Figure 10:
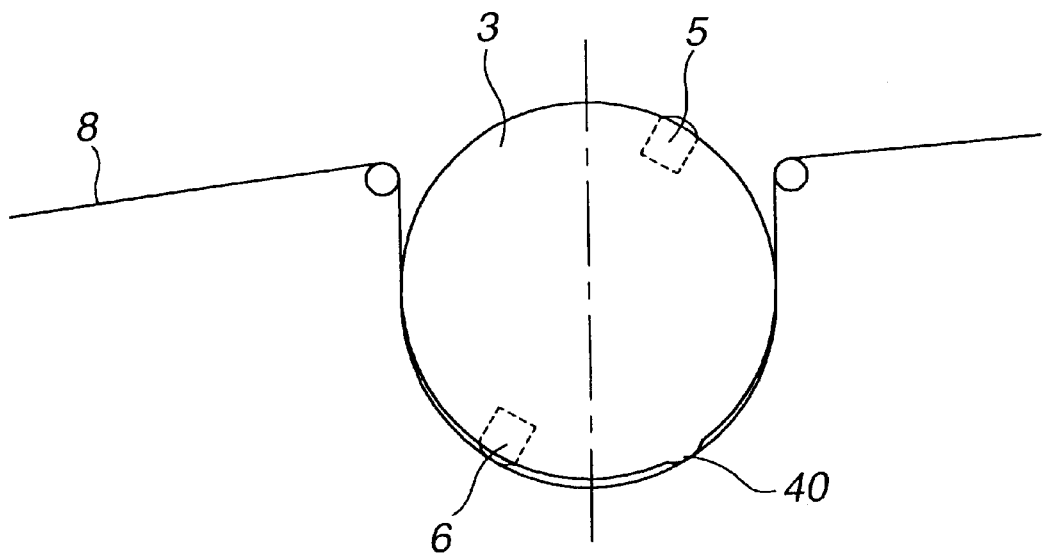
FIG. 10 is a plan view of a variant of the rotating drum assembly according to the present invention, showing an example of the construction thereof.
Figure 11:
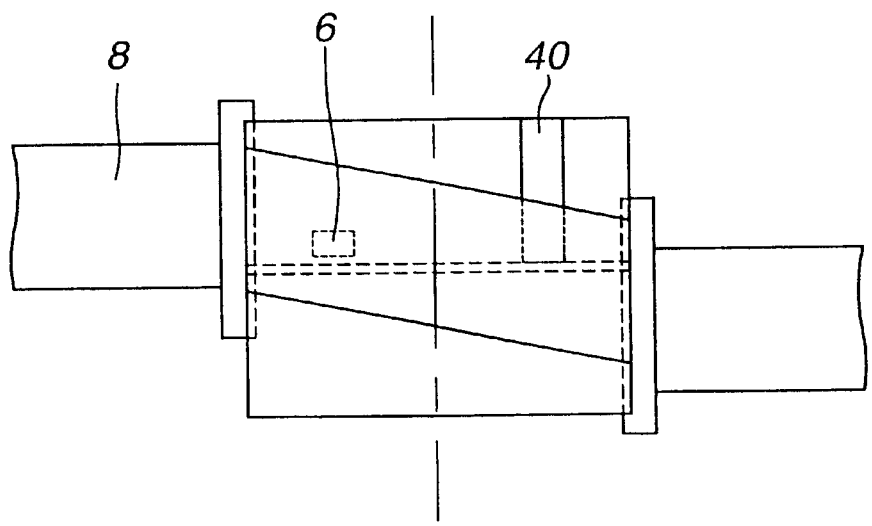
FIG. 11 is a side elevation of another variant of the rotating drum assembly according to the present invention, showing an example of the construction thereof.

It should be noted that the rotating drum assembly 1 may have provided on the rotating drum 3 a projection 40 in place of the dummy head 7 as shown in FIGS. 10 and 11. The projection 40 slides in earlier contact on the magnetic tape 8 than the MR head 6. In this case, the projection 40 should preferably have a larger width of contact with the magnetic tape 8 than the MR head 6.

As shown in FIG. 11 for example, the projection 40, formed over the width of the rotating drum 3, will allow the MR head 6 to trace generally fully a path on the magnetic tape 8 on which the projection 40 has already traveled in sliding contact. Thus, even with an unused magnetic tape 8, the MR head 6 can be prevented from easily being abraded. Further, the projection 40 formed over the width of the rotating drum 3 makes it unnecessary to adjust the position of the projection 40 in relation to the MR head 6, which would be necessary when the dummy head 7 is installed on the rotating drum 3. Thus, the rotating drum assembly 1 can be simplified in construction.

In the forgoing, the rotating drum assembly according to the present invention has been described concerning a one in which the inductive head, MR head and dummy head are installed one each on the rotating drum. However, the present invention is not limited to this construction, but is applicable to a rotating drum assembly and a magnetic recording/reproducing apparatus using the rotating drum assembly, in which the inductive head, MR head and dummy head are installed more than one each on the rotating drum.

Second Embodiment

Figure 12:
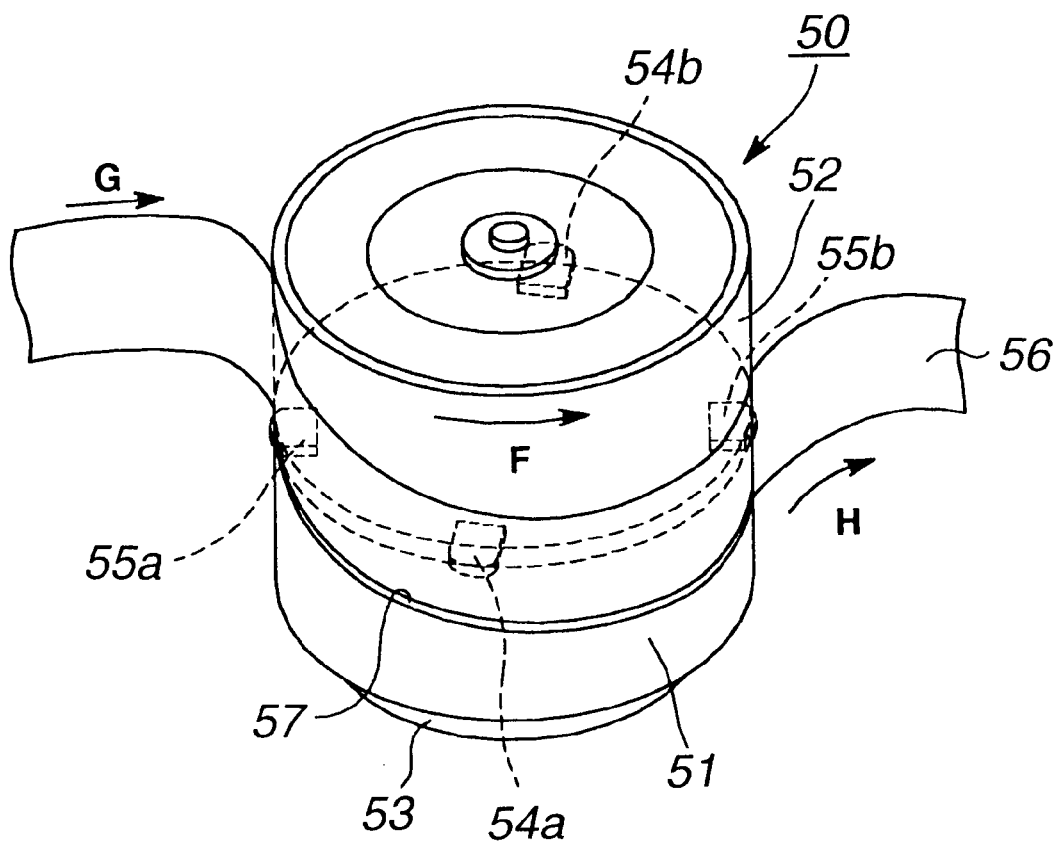
FIG. 12 is a perspective view of another embodiment of rotating drum assembly according to the present invention, showing the construction thereof.
Figure 13:
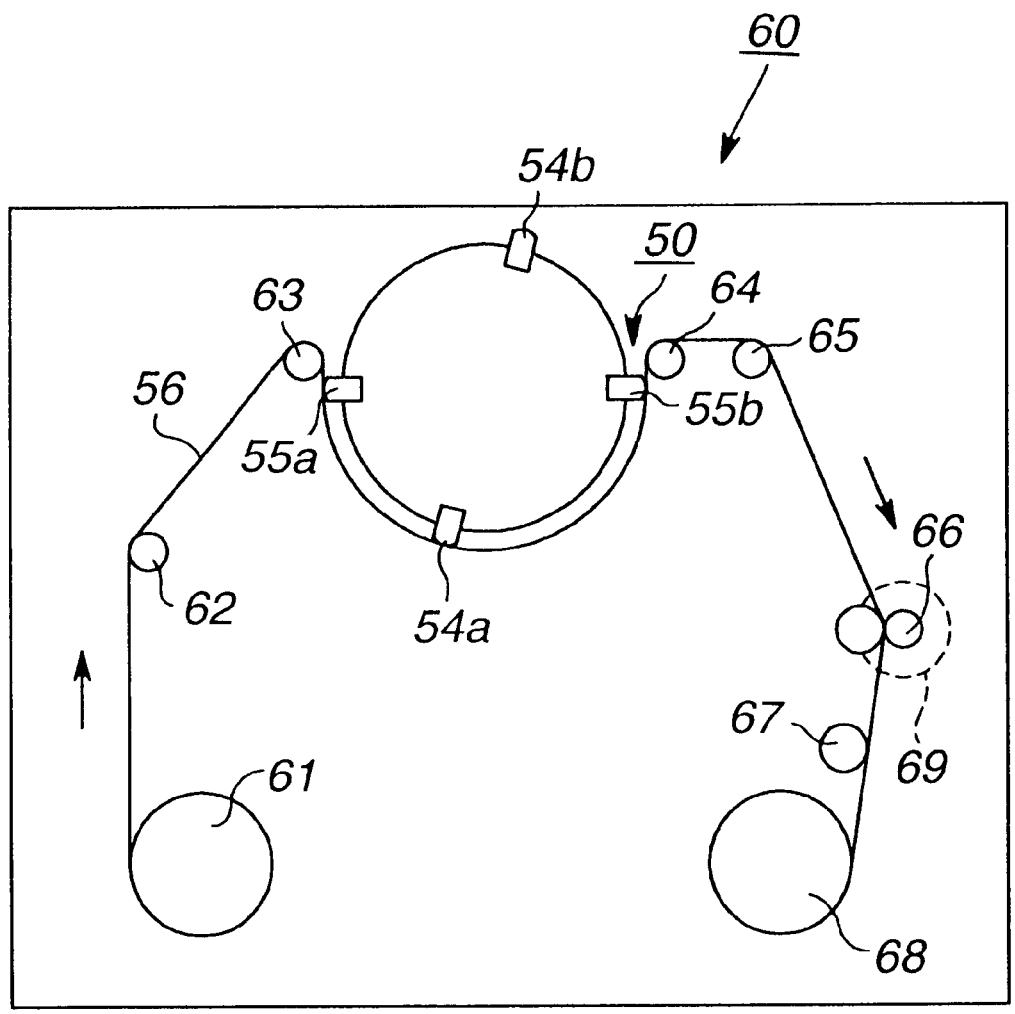
FIG. 13 is a plan view of the magnetic tape feeding mechanism including the rotating drum assembly, showing an example of the construction thereof.

Next, another embodiment of the present invention will be described herebelow:

Referring now to FIGS. 12 and 13, there is illustrated the second embodiment of the rotating drum assembly according to the present invention, and FIG. 12 is a perspective view of the second embodiment of rotating drum assembly according to the present invention, showing the construction thereof, and FIG. 13 is a plan view of the magnetic tape feeding mechanism including the rotating drum assembly, showing the construction thereof. The rotating drum assembly is generally indicated with a reference 50, and the magnetic tape feeding mechanism is generally indicated with a reference 60.

The rotating drum assembly 50 comprises a cylindrical fixed drum 51, a cylindrical rotating drum 52, a drive motor 53 for the rotating drum 52, a pair of inductive heads 54a and 54b installed on the rotating drum 52, and a pair of MR heads 55a and 55b installed on the rotating drum 52.

The fixed drum 51, rotating drum 52, drive motor 53, inductive heads 54a and 54b and MR heads 55a and 55b are constructed similarly to the fixed drum 2, rotating drum 3, motor 4, inductive head 5 and MR head 6 in the first embodiment, and so will not be described in further detail herebelow.

The inductive heads 54a and 54b write information signal or data to a magnetic tape 56. They form an angle of 180 deg. with the center of the rotating drum 52, and are installed on the rotating drum 52 for their gaps to project from the outer surface of the rotating drum 52. Note that the inductive heads 54a and 54b have azimuths, respectively, which are reciprocal of each other so that the inductive heads 54a and 54b will make a guard-bandless recording to the magnetic tape 56 each with a predetermined azimuth. The azimuths should preferably be about 5 to 30 deg.

On the other hand, the MR heads 55a and 55b read information signal or data from the magnetic tape. They form an angle of 180 deg. with the center of the rotating drum 52, and are installed on the rotating drum to project at an MR element piece thereof from the outer surface of the rotating drum 52. Note that the MR heads 55a and 55b have azimuths, respectively, which are reciprocal of each other so that the inductive heads 54a and 54b will detect a guard-bandless recorded magnetic signal from the magnetic tape 56 each with a predetermined azimuth.

In the magnetic recording/reproducing apparatus according to the present invention, the rotating drum assembly 50 is slid on the magnetic tape 56 to write or read data to or from the magnetic tape 56.

More specifically, the magnetic tape 56 is fed from a supply reel 61 over guide rollers 62 and 63 to the rotating drum assembly 50 on which it will be wound, as shown in FIG. 13, and at which write to or read from the magnetic tape 56 will be done.

For writing data to the magnetic tape 56, the pair of inductive heads 54a and 54b are slid on the magnetic tape 56 to make a guard-bandless recording to the magnetic tape 56.

For reading data from the magnetic tape 56, the pair of MR heads 55a and 55b are sled on the magnetic tape 56 to read from the latter a data having been written by the pair of inductive heads 54a and 54b.

When the inductive heads 54a and 54b are slid on the magnetic tape 56 or when the MR heads 55a and 55b are slid on the magnetic tape 56, the magnetic tape 56 is supported mainly by the rotating drum 52 and air flow caused to arise mainly by the rotating drum 52 being rotated. At this time, the inductive heads 54a and 54b projected at the gaps and their vicinity from the outer surface of the rotating drum 52 and the MR heads 55a and 55b projected at the MR element pieces and their vicinity from the outer surface of the rotating drum 52, slide in contact on the magnetic tape 56 while seemingly pitching a tent of the magnetic tape 56.

If the magnetic head slides in contact on the magnetic tape 56 at a high speed, the tape-sliding surface of the magnetic head will be abraded due to the sliding in contact on the magnetic tape 56. Especially, the MR heads 55a and 55b will heavily be abraded since their depth is small.

An unused magnetic tape 56 initially has fine irregularities on the surface thereof, and hence the surface is very rough. Therefore, when such an unused magnetic tape 56 is used initially on the MR heads 55a and 55b, the latter will be abraded very much due to the sliding in contact on the magnetic tape 56.

To avoid such excessive abrasion of the MR heads 55a and 55b, the rotating drum assembly 50 is provided with the inductive heads 54a and 54b each in a position ahead of the MR heads 55a and 55b, respectively, in relation to the magnetic head 56 as shown in FIG. 12. The inductive heads 54a and 54b will not so much be abraded by the magnetic tape 56 than the MR heads 55a and 55b. The inductive heads 54a and 54b are first slid in contact on the magnetic tape 56 to smooth the surface of the magnetic tape 56, whereby it is possible to prevent the MR heads 55a and 55b, which will slid following the respective inductive heads 54a and 54b, from being abraded easily and excessively.

Next, the geometric relation between the inductive heads 54a and 54b and MR heads 55a and 55b will be described herebelow:

The magnetic tape 56 used in a helical-scan magnetic recording/reproducing apparatus has data tracks formed thereon at a predetermined angle with respect to the length thereof The inductive heads 54a and 54b trace the data tracks on the magnetic tape 56 to write information signal to the magnetic tape 56, while the MR heads 55a and 55b trace the data tracks to read information signal from the magnetic tape 56.

Figure 14:
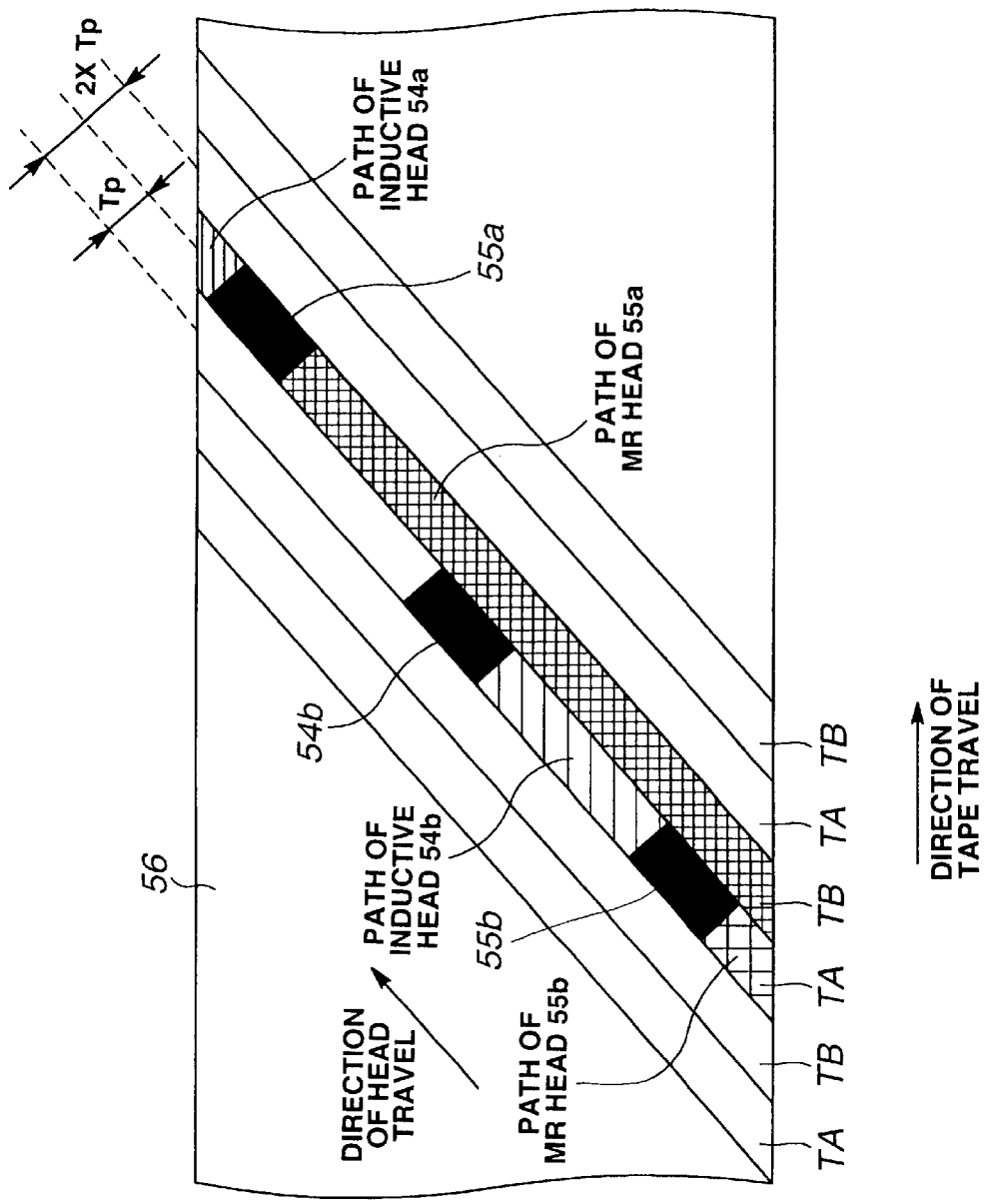
FIG. 14 is a plan view of a magnetic tape, showing a format of data tracks formed on the magnetic tape.

As shown in FIG. 14 for example, the magnetic tape 56 has data tracks TA and TB alternately formed thereon. Note that the data tracks TA are formed to have such an azimuth that the inductive head 54a can write information signal to the data tracks TA and the MR head 55a can read recorded information signal from the data tracks TA, and that the data tracks TB are formed to have such an azimuth that the inductive head 54b can write information signal to the data tracks TB and the MR head 55b can read recorded information signal from the data tracks TB.

The magnetic tape 56 has the data tracks TA and TB formed thereon at a pitch Tp. Assume here that the magnetic tape 56 is fed or travels over a distance 2×Tp each time the rotating drum 52 is rotated one full turn. At this time, the magnetic tape 56 slides obliquely with respect to the fixed and rotating drums 51 and 52 along a lead guide 57 on the fixed drum 51 as shown in FIG. 12.

Figure 15:
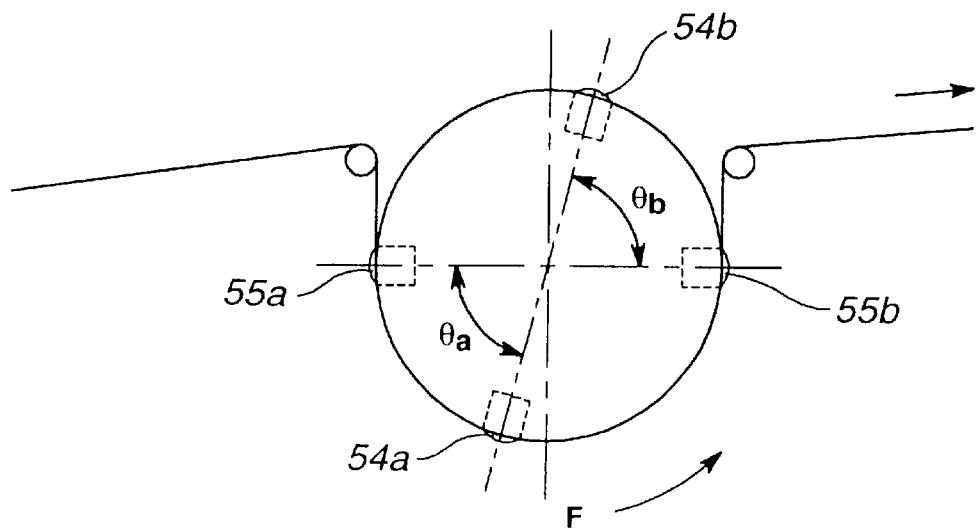
FIG. 15 is a plan view of the rotating drum assembly in FIG. 12.
Figure 16:
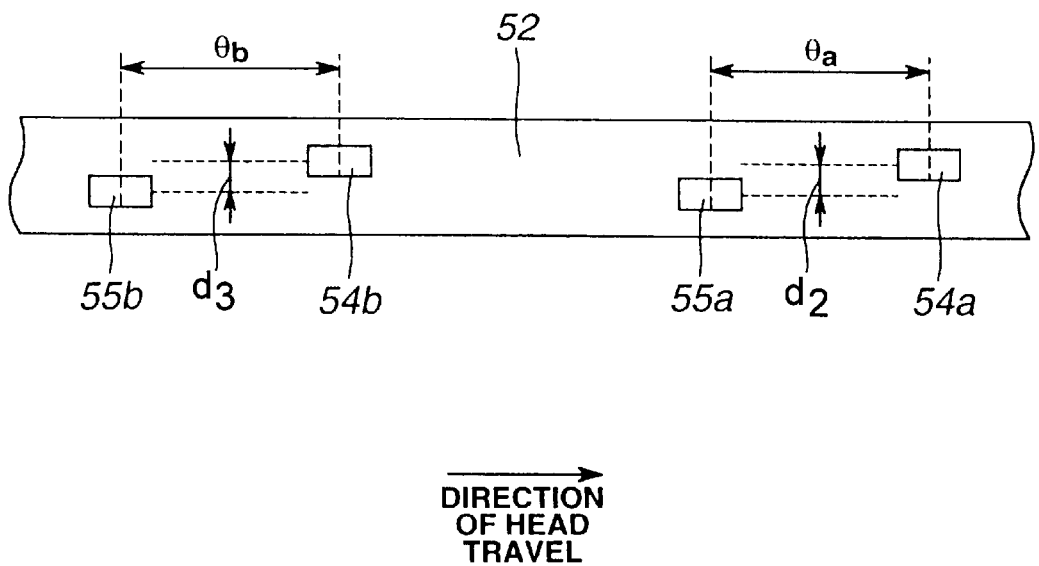
FIG. 16 schematically shows the geometric relation between the inductive and MR heads installed on the rotating drum assembly in FIG. 12.

In the rotating drum assembly 50, the inductive head 54a is installed on the rotating drum 52 in a position an angle θa ahead of the MR head 55a while the inductive head 54b is installed on the rotating drum 52 in a position θb ahead of the MR head 55b, as shown in FIG. 15. In this rotating drum assembly 50, the inductive head 54a is disposed in a position $t_2=\{(n_1 \times Tp)+(Tp \times \theta a/180)\}$ (where $n_1=0, 1, 2, 3, \ldots$) than the MR head 55a while the inductive head 54b is disposed in a position $d_3=\{(n_2 \times Tp)+(Tp \times \theta b/180)\}$ (where $n_2=0, 1, 2, 3, \ldots$) than the MR head 55b, as shown in FIG. 16. FIG. 15 is a plan view of the rotating drum assembly 50 in FIG. 12, and FIG. 16 schematically shows the geometric relation between the inductive and MR heads 54a and 55a and that between the inductive and MR heads 54b and 55b, all the heads being installed on the rotating drum 52 shown with the lateral side thereof cut out.

Owing to the aforementioned geometric relation between the inductive heads 54a and 54b and MR heads 55a and 55b, respectively, before the MR beads 55a and 55b slide in contact on a portion of the magnetic tape 56, the inductive heads 54a and 54b will first slide in contact on the same portion to smooth the surface of the magnetic tape portion 56, as shown in FIG. 14.

Further, the inductive heads 54a and 54b are formed to have a larger width of contact with the magnetic tape 56 than the MR heads 55a and 55b. This larger tape-contact width of the inductive heads 54a and 54b than that of the MR heads 55a and 55b will assure that the MR heads 55a and 55b can generally fully trace the magnetic tape portion on which the inductive heads 54a and 54b have already slid in contact. Thus, even with an unused magnetic tape 56, the MR heads 55a and 55b can be prevented from easily being abraded since they will trace the magnetic tape portion 56 on which the inductive heads 54a and 54b have once slid in contact.

As shown in FIG. 13, the magnetic tape 56 after write or read thereto or therefrom at the rotating drum assembly 50 is fed over guide rollers 64 and 65, capstan 66 and a guide roller 67 to a take-up reel 68 on which it will be wound. At this time, the magnetic tape 56 is moved at a predetermined speed by the capstan 66 driven by a capstan motor 69.

When the magnetic tape 56 is thus moved, the rotating drum 52 is driven to rotate by the motor 53 in the direction of arrow F in FIG. 12. On the other hand, the magnetic tape 56 is moved obliquely with respect to the fixed and rotating drums 51 and 52 along the lead guide 57 on the fixed drum 51. That is to say, the magnetic tape 56 is driven to travel from a tape inlet along the lead guide 57 in the direction of arrow G in FIG. 12 while sliding in contact on the fixed and rotating drums 51 and 52 and then towards a tape outlet in the direction of arrow H in FIG. 12.

According to the present invention, the rotating drum assembly 50 is adapted such that the MR heads 55a and 55b trace a path on the magnetic tape 56 on which the inductive heads 54a and 54b have already traveled ahead of the MR heads 55a and 55b. Therefore, so long as the inductive heads 54a and 54b are disposed in positions sufficiently higher than the MR heads 55a and 55b, respectively, the inductive heads 54a and 54b and MR heads 55a and 55b in FIG. 16 may not meet the required geometric relations $d_2=\{(n_1 \times Tp)+(Tp \times \theta a/180)\}$ and $d_3=\{(n_2 \times Tp)+(Tp \times \theta b/180)\}$ (where $n_2=0, 1, 2, 3, \ldots$). Namely, if the inductive heads 54a and 54b are positioned sufficiently higher than the MR heads 55a and 55b, respectively, the latter can generally precisely trace paths on which the inductive heads 54a and 54b have already traveled in contact, even when the paths of the inductive heads 54a and 54b are not coincident with those of the MR heads 55a and 55b, respectively.

In the foregoing, the present invention has been described concerning the embodiments in which an MR head or MR heads having the MR element formed from a soft magnetic layer having anisotropic magneto-resistance effect into a predetermined shape, is used as the read head. However, the present invention is not limited to these embodiments, but applicable to a rotating drum assembly adopting an MR head using a giant magneto-resistive element (GMR element) multi-layered to show a giant magneto-resistance effect.

The rotating drum assembly is adapted according to the present invention such that the tape-contact piece slides in earlier contact on the magnetic tape than the MR head to smooth the magnetic tape surface, whereby the MR head can be prevented from easily being abraded. This will lead to a longer life of the MR head.

The magnetic recording/reproducing apparatus is adapted according to the present invention such that the tape-contact piece slides in earlier contact on the magnetic tape than the MR head to smooth the magnetic tape surface, whereby the MR head can be prevented from easily being abraded. This will lead to a longer life of the MR head.

Therefore, the present invention can implement a rotating drum assembly and a helical-scan magnetic recording/reproducing apparatus, in which an MR head is employed as a read head.

What is claimed is:

1. A rotating drum assembly comprising:
   a cylindrical rotating drum;
   a magneto-resistive head installed on the rotating drum to project at least a part thereof from the outer surface of the rotating drum; and
   a tape-contact piece on the rotating drum between a first end and a second end of the rotating drum so as to project from the outer surface of the rotating drum and to be in contact with the surface of a magnetic tape,
   wherein,
      the tape-contact piece is formed to have a larger tape-contact width than that of the magneto-resistive head and is disposed to be in earlier contact with the magnetic tape than the magneto-resistive head, and
      the tape-contact piece slides in contact with a portion of the magnetic tape at least twice before said magneto-resistive head slides in contact with the same portion of said magnetic tape.

2. The rotating drum assembly as set forth in claim 1, wherein the tape-contact piece is a dummy head installed on the rotating drum to project at least a part thereof from the outer surface of the rotating drum.

3. The rotating drum assembly as set forth in claim 2, wherein the projection of the dummy head from the outer surface of the rotating drum is larger than that of the magneto-resistive head from the outer surface of the rotating drum.

4. The rotating drum assembly of claim 1, wherein the direction of head travel with respect to the magnetic tape is defined by the formula $T_p \times (n+\theta/360)$, where $T_p$ is track pitch, n is an integer greater than 2, and angle θ is a position at which the tape-contact piece is installed on the rotating drum ahead of the magneto-resistive head.

5. The rotating drum assembly of claim 1, wherein the magneto-resistive head comprises:

a magneto-resistive element piece;

two permanent magnet layers disposed on opposite ends of said magneto-resistive element piece; and two conductors disposed on opposite ends of said magneto-resistive element piece.

6. The rotating drum assembly of claim 1, further comprising:

a magneto-resistance element piece in said magneto-resistive head, said magneto-resistance piece being flat and having a generally rectangular shape whose shorter axis direction is generally perpendicular to a tape-sliding surface of said magneto-resistive head, wherein said magneto-resistance element piece is buried and held in an insulator between a pair of magnetic shields for one lateral face of said magneto-resistance element piece to be exposed at a tape-sliding surface of said magneto-resistive head.

7. The rotating drum assembly of claim 1, wherein the projection of said tape-contact piece from the outer surface of said rotating drum is about two times the projection of said magneto-resistive head.

8. A helical-scan magnetic recording/reproducing apparatus comprising:

a cylindrical rotating drum;

a magneto-resistive head installed on the rotating drum to project at least a part thereof from the outer surface of the rotating drum; and a tape-contact piece on the rotating drum between a first end and a second end of the rotating drum so as to project from the outer surface of the rotating drum and to be in contact with the surface of a magnetic tape, said tape-contact piece having a radial length substantially smaller than one-half of the radial length of said rotating drum, wherein, the tape-contact piece is formed to have a larger tape-contact width than that of the magneto-resistive head and is disposed to be in earlier contact with the magnetic tape than the magneto-resistive head, and the tape-contact piece slides in contact with a portion of the magnetic tape at least twice before said magneto-resistive head slides in contact with the same portion of said magnetic tape.

9. The magnetic recording/reproducing apparatus as set forth in claim 8, wherein the tape-contact piece is a dummy head installed on the rotating drum to project at least a part thereof from the outer surface of the rotating drum.

10. The magnetic recording/reproducing apparatus as set forth in claim 9, wherein the projection of the dummy head from the outer surface of the rotating drum is larger than that of the magneto-resistive head from the outer surface of the rotating drum.

11. The helical-scan magnetic recording/reproducing apparatus of claim 8, wherein the direction of head travel with respect to the magnetic tape is defined by the formula $T_p \times (n+\theta/360)$, where $T_p$ is track pitch, n is an integer greater than 2, and angle θ is a position at which the tape-contact piece is installed on the rotating drum ahead of the magneto-resistive head.

12. The helical-scan magnetic recording/reproducing apparatus of claim 8, wherein the magneto-resistive head comprises:

a magneto-resistive element piece;

two permanent magnet layers disposed on opposite ends of said magneto-resistive element piece; and two conductors disposed on opposite ends of said magneto-resistive element piece.

13. The helical-scan magnetic recording/reproducing apparatus of claim 8, further comprising:

a magneto-resistance element piece in said magneto-resistive head, said magneto-resistance piece being flat and having a generally rectangular shape whose shorter axis direction is generally perpendicular to a tape-sliding surface of said magneto-resistive head, wherein said magneto-resistance element piece is buried and held in an insulator between a pair of magnetic shields for one lateral face of said magneto-resistance element piece to be exposed at a tape-sliding surface of said magneto-resistive head.

14. The helical-scan magnetic recording/reproducing apparatus of claim 8, wherein the projection of said tape-contact piece from the outer surface of said rotating drum is about two times the projection of said magneto-resistive head.

* * * * *